US012562472B2

(12) United States Patent
Kossin

(10) Patent No.: US 12,562,472 B2
(45) Date of Patent: Feb. 24, 2026

(54) STEERABLE ANTENNA SYSTEM AND METHOD

(71) Applicant: Canyon Consulting, LLC, Los Angeles, CA (US)

(72) Inventor: Philip S. Kossin, Passaic, NJ (US)

(*) Notice: Subject to any disclaimer, the term of this patent is extended or adjusted under 35 U.S.C. 154(b) by 567 days.

(21) Appl. No.: 17/968,733

(22) Filed: Oct. 18, 2022

(65) Prior Publication Data

US 2023/0118396 A1 Apr. 20, 2023

Related U.S. Application Data

(60) Provisional application No. 63/256,951, filed on Oct. 18, 2021.

(51) Int. Cl.
*H01Q 3/24* (2006.01)
*H01Q 3/34* (2006.01)
*H01Q 19/13* (2006.01)

(52) U.S. Cl.
CPC ................. *H01Q 3/24* (2013.01); *H01Q 3/34* (2013.01); *H01Q 19/13* (2013.01)

(58) Field of Classification Search
CPC ............ H01Q 3/24; H01Q 3/34; H01Q 19/13; H01Q 3/44; H01Q 15/0086; H01Q 21/26
See application file for complete search history.

(56) References Cited

U.S. PATENT DOCUMENTS 6,395,971 B1 * 5/2002 Bendel ..................... H01Q 1/28 343/866
9,966,670 B1 5/2018 Kuo et al.
11,245,194 B1 * 2/2022 Ananth .................... H01Q 1/28
11,962,072 B2 * 4/2024 Brobston ................ H01Q 3/24
(Continued)

FOREIGN PATENT DOCUMENTS

CN 110571530 A 12/2019
WO 2023069468 A1 4/2023

OTHER PUBLICATIONS

"International Search Report and Written Opinion for International Patent Application No. PCT/US2022/47064 Search completed on Feb. 23, 2023 Mailed on Feb. 24, 2023."
(Continued)

*Primary Examiner* — Vladimir Magloire
*Assistant Examiner* — Anna K. Gosling
(74) *Attorney, Agent, or Firm* — Kutak Rock LLP; Jason S. Jackson

(57) ABSTRACT

An antenna system steerable in any direction and methods of use are provided. In an embodiment, the antenna system comprises a substantially ellipsoid-shaped shell body and a plurality of cells coupled to the body, wherein each cell comprises a conductive material. In an embodiment, the shell body comprises a metasurface. In an embodiment, the antenna system further includes a plurality of switches coupled to the plurality of cells, wherein each switch is configured to change its coupled cell between reflective, transmissive, and absorptive states. The antenna system further includes a feed radiator located at or around the center of the shell body; a radio coupled to the feed; and a processor coupled to the feed, radio, and the plurality of switches, wherein the processor is configured to produce a shaped beam by controlling a subset of the plurality of switches.

19 Claims, 12 Drawing Sheets

(56) References Cited

U.S. PATENT DOCUMENTS

| | | | | |
|---|---|---|---|---|
| 2004/0108966 | A1* | 6/2004 | McKivergan | H01Q 9/42 343/895 |
| 2005/0146477 | A1* | 7/2005 | Kelly | H01Q 21/005 343/711 |
| 2005/0179615 | A1 | 8/2005 | Mrstik et al. | |
| 2013/0009851 | A1* | 1/2013 | Danesh | H01Q 1/44 343/904 |
| 2015/0255877 | A1* | 9/2015 | Liu | H01Q 15/02 343/909 |
| 2018/0212334 | A1 | 7/2018 | Walker | |
| 2019/0229388 | A1* | 7/2019 | Wang | H01Q 3/36 |
| 2019/0260120 | A1* | 8/2019 | Khushrushahi | H01Q 19/062 |
| 2019/0280391 | A1* | 9/2019 | Sanjuan Flores | H01Q 1/38 |
| 2020/0103643 | A1 | 4/2020 | Xu | |

OTHER PUBLICATIONS

"International Preliminary Report on Patentability Received for International Patent Application No. PCT/US2022/047064, Report Issued on Apr. 23, 2024, Mailed on May 2, 2024."

* cited by examiner

STEERABLE ANTENNA SYSTEM AND METHOD

CROSS-REFERENCE TO RELATED APPLICATIONS

This application claims priority pursuant to 35 U.S.C. 119(e) to U.S. Provisional Patent Application Ser. No. 63/256,951, filed Oct. 18, 2021, the entirety of which is incorporated herein by reference.

FIELD OF THE INVENTION

The present invention relates generally to antenna systems. More specifically, the present invention is concerned with an electronically controlled reflector antenna system for steering a beam in any three-dimensional direction and methods of use thereof.

BACKGROUND OF THE INVENTION

Antenna systems are widely used in the transmission and receipt of electromagnetic waves carrying various signals and data. A subset of antenna systems, beam steering antenna systems, are utilized to accommodate adjustment of electromagnetic wave beam direction. Such beam steering antennas are of particular use in scenarios in which a user wants to communicate with multiple different electromagnetic wave systems, such as multiple different satellites, and/or when a user is mobile and wants to communicate via electromagnetic waves from multiple different physical locations.

Nevertheless, conventional beam steering antennas have several disadvantages. For example, most conventional phased array beam steering antennas are substantially flat, require mechanical pointing of the antenna, and have additional losses at low elevation angles. Additionally, many currently available beam steering antennas are too large, too heavy, and require too much power for convenient use, particularly in a motive environment.

Conventional phased array beam steering antennas typically consist of a number of elements which transmit a coherent radio frequency (RF) signal controlled in phase and amplitude to steer a beam in a certain direction. These antennas require the phase of each element to be tightly controlled and coherence of the elements. In practice this is difficult to achieve because the elements are typically powered and controlled separately, have separate synthesizers at each element, or have a number of oscillators that serve subarray elements. If these oscillators or synthesizers are not synchronized, the beam steering of the antenna is degraded.

Furthermore, conventional beam steering antenna elements contain amplifiers and other RF components which have phase and group delay that change based on temperature and other factors. Beam steering will degrade if such variations are not compensated for and calibrated. For the beam steering of these conventional beam steering antennas to work properly, each element must have its own beam steering vector phase or phase/amplitude applied to the signal radiated from that element. This all requires significant RF circuitry and results in added complexity, weight, and required power.

Another disadvantage of conventional phased array beam steering antennas stems from the phased arrays being arranged on a flat or slightly curved surface. In conventional antenna systems, one direction is defined as boresight, which is typically zenith, or upward. When steering a conventional beam steering antenna at large scan angles away from the boresight direction, there is scan degradation due to the squint of the planar area as the scan goes toward the sides of the antenna. Conventionally, planar phased arrays cannot radiate at 90-degrees from boresight, and the gain for these arrays degrades steeply before a 90-degree scan. Moreover, for circular polarization, which is usually used for satellite systems, the axial ratio (AR) is generally good when pointed at zenith and up to approximately 50-degrees to each side, however once the beam is steered to more than 50-degrees from boresight, the AR degrades and the desired polarization is no longer preserved. For systems with static polarization, such as RHCP, LHCP, or fixed, up to three decibels (dB) of degradation occurs from steering the beam more than 50-degrees from boresight. Systems using polarization diversity, such as information carried by the shifting polarization between RHCP, LHCP, and linear, cannot work to the sides of such a conventional phased array because the polarization information is stripped from the signal.

Therefore, there is a long-felt but unmet need in the art for a small, light, simple, and power-efficient antenna system which accommodates effective beam steering in all directions. Heretofore, there has not been available an antenna system or method with the advantages and features of the present invention.

SUMMARY OF THE INVENTION

The present invention comprises an antenna system which accommodates steering an electromagnetic wave beam in any direction in three dimensions (i.e., azimuth or elevation). In an exemplary embodiment, an antenna of the present invention comprises an electronically controlled reflector (ECR), or metasurface, antenna which can be directed in any direction with 4-Pi Steradian coverage. In an embodiment, the antenna of the present invention includes a shell body forming a substantially ellipsoid-shaped surface covered with an electronically controlled reflective surface, including an electromagnetic metasurface. In embodiments, the substantially ellipsoid-shaped surface comprises a substantially sphere-shape, a geodesic polyhedron, or any other substantially ellipsoid-shape.

In an exemplary embodiment, the metasurface shell body is made up of cells or mesh which are controlled by solid-state switches configured to form a shaped beam with increased gain in the desired direction. In an exemplary embodiment, the feed radiator of the antenna is located at or near the center of the shell body. Embodiments of the present invention can therefore be used for transmitting and/or receiving electromagnetic signals, and the antenna of the present invention can be used on multiple frequency bands.

In a preferred embodiment, the present electronically steered antenna is sized small enough to be worn by a human operator or mounted on a mobile platform. Furthermore, in embodiments, the antenna of the present invention is capable of operation while the user or platform it is mounted on is in motion. In an embodiment, the present antenna is configured to keep the beam pointed at a remote station by controlling the beam pointing, thereby steering the beam to compensate for motion. Thus, the present invention is well-equipped for various man-portable and/or man-mobile use cases.

In an exemplary embodiment, the present antenna is configured to electronically track satellites with enough gain to close the link, while also compensating for operator movement. The generally ellipsoidal shape allows the beam to form equally in any direction without the need for additional mechanical pointing and without additional losses for low elevation angles.

The reflector of the present invention, reflecting or not reflecting the radiation from the feed as controlled by a system processor, is an RF passive function. Accordingly, there is no need for coherent phase or phase control of numerous elements, which greatly reduces the size, weight, power consumption, complexity, and cost of the present invention when compared to conventional beam steering antennas.

Embodiments of the present invention include mobile devices to form a high-gain beam for receiving data from or transmitting data to a satellite or other remote station. Further embodiments of the present invention include small satellite terminals for drones. Additional embodiments of the invention include deployable or fixed antennas, and embodiments of the present invention include use as a spacecraft antenna or as a ground user terminal.

In an exemplary embodiment, a processor is configured for steering the antenna beam automatically to track satellites or other targets while compensating for the motion and position of the operator. In use of the present antenna system, the operator is able to communicate voice, text, images, and/or other data signals without having to consciously think about the antenna and how it is positioned.

The foregoing and other objects are intended to be illustrative of the invention and are not meant to add unclaimed elements to any claim presented herein. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Embodiments of the present invention are described in detail below with reference to the attached drawing figures, wherein.

Figure 1:
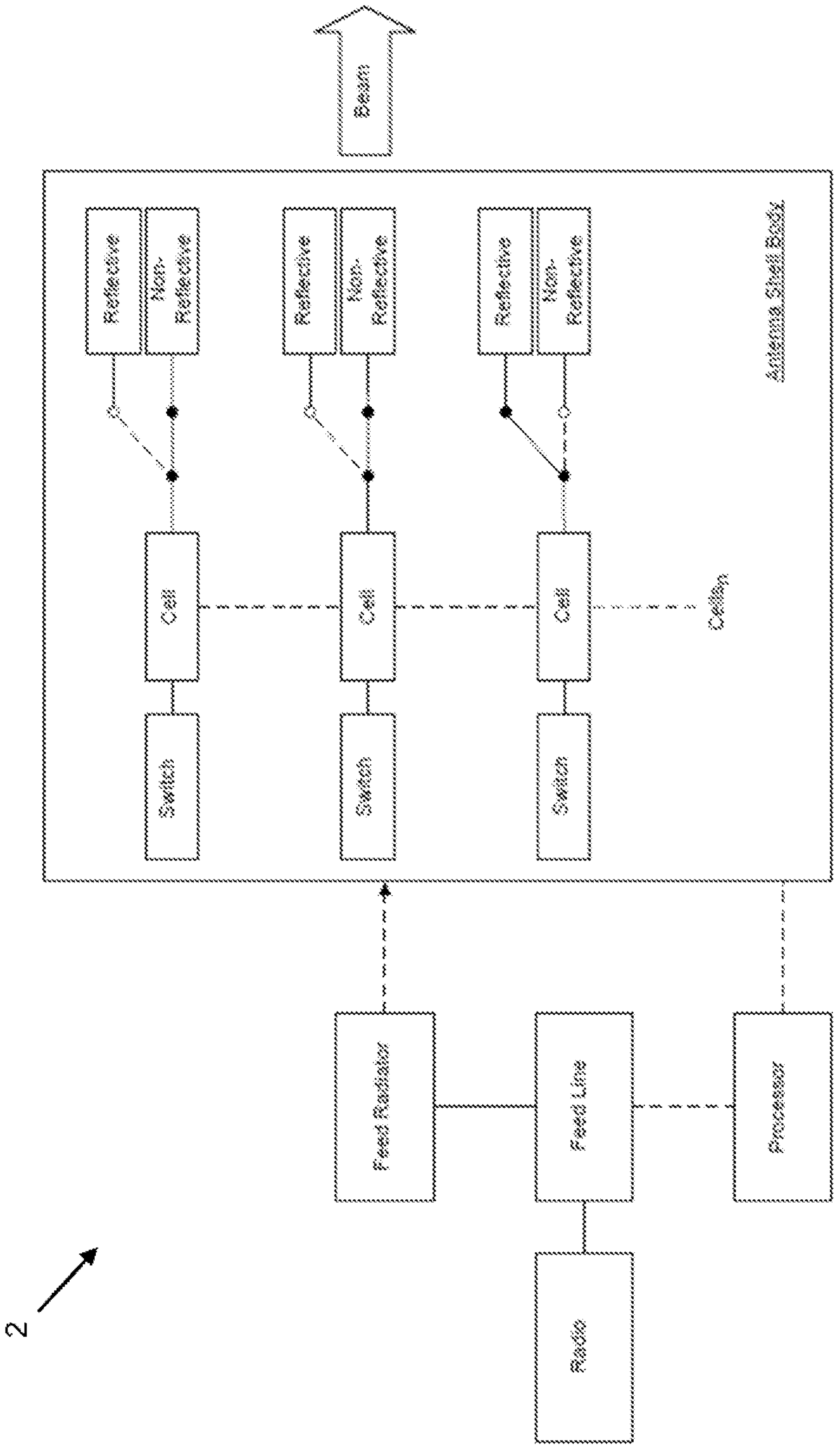
FIG. 1 is a block diagram of an antenna system of one embodiment of the present invention.

The drawing figures do not limit the present invention to the specific embodiments disclosed and described herein. The drawings are not necessarily to scale, emphasis instead being placed upon illustrating the principles of the invention.

DETAILED DESCRIPTION OF THE PREFERRED EMBODIMENTS

As required, a detailed description of the present invention is disclosed herein; however, it is to be understood that the disclosed embodiments are merely exemplary of the principles of the invention, which may be embodied in various forms. Therefore, specific structural and functional details disclosed herein are not to be interpreted as limiting and as a representative basis for teaching one skilled in the art to variously employ the present invention in virtually any appropriately detailed structure.

Various embodiments of the present invention provide steerable antenna systems and methods. The antenna system of the present invention can be steerable in all directions. Embodiments of the present antenna have lower power, cost, and complexity as compared to phased array steerable antennas. The present antenna is capable of maintaining full gain in all directions and without squint. With no moving parts, the disclosed antenna is superior to a mechanical gimbal reflector and other conventional beam steering antennas.

Referring to FIGS. 1-4, an exemplary embodiment of an antenna system of the present invention is shown. The antenna system 2 comprises a substantially ellipsoid-shaped shell body 10 and a plurality of cells 20 coupled to the body, wherein each cell comprises a conductive material. In an embodiment, the antenna system 2 further includes a plurality of switches coupled to the plurality of cells 20, wherein each switch is configured to change its coupled cell between a reflective state 22 and a non-reflective state 24. In embodiments, the switches also change the cells into transmissive and absorptive states as desired. The antenna system 2 further includes a feed radiator 30 located around the center of the shell body 10; a radio coupled to the feed; and a processor coupled to the feed, radio, and the plurality of switches, wherein the processor is configured to produce a shaped beam 50 by controlling a subset of the plurality of switches. In an exemplary embodiment, the feed comprises a feedline and a feed radiator.

In an embodiment of the present invention, the substantially ellipsoid-shape body comprises substantially a sphere shape. In an embodiment, the body comprises a polyhedron, such as but not limited to a geodesic polyhedron. A polyhedron shell body of the present invention can have any number of surfaces including and between four to 1,000,000 surfaces. Alternatively, the shell body of the present antenna can form any other substantially ellipsoidal shape.

In embodiments, each cell comprises a closed geometric shape. In embodiments, such closed geometric shape comprises at least one of a triangular, square, pentagonal, hexagonal, octagonal, polygon, elliptical, and irregular polygonal shape.

In other embodiments, each cell comprises an open geometric shape. Embodiments include, but are not limited to, the open geometric shape comprising a spiral, two or more intersecting lines, or a triad. In a further embodiment, the cells of the antenna system form a helical configuration radially coming in or out of the shell body.

In an exemplary embodiment of the present invention, the cells of the shell body comprise a configuration of different geometries such that the antenna system can operate at multiple frequencies. Preferably, such multifrequency operation can occur simultaneously or at different times, as desired by the operator. In an exemplary embodiment, the cells of the shell body comprise a configuration of different geometries to allow for a reflective sphere with more effective coverage.

In embodiments of the present invention, at least one of the cells of the antenna system shell body comprises two or more nested surfaces. In embodiments, one cell comprises nested surfaces, all of the cells comprise nested surfaces, or some subset of the cells comprises nested surfaces. In embodiments, some or all of the cells comprise any number of nested surfaces.

In an embodiment of the present antenna system, one or more of the cells reflect polarized radiation. In exemplary embodiments, the polarized radiation comprises circular polarized radiation, linear polarized radiation, elliptical polarized radiation, or combinations thereof.

In exemplary embodiments of the present antenna system, the plurality of switches comprises one or more of electromechanical, solid-state FET, diodes, PIN diodes, varactor diodes, photo detector, photodiodes, phototransistors, chemical, or fluid enabled switches or surfaces.

In an embodiment of the present invention, the cells are separately controlled. In other embodiments, the cells are controlled in groupings or sections of cells. In some embodiments, the cells do not interconnect with the other cells of the shell body. In other embodiments, the cells are electrically connected to each other. In embodiments, the plurality of cells form a mesh or other connected surface.

In an exemplary embodiment, the switches of the antenna system are coupled to control lines. In embodiments, the control lines comprise one or more of etched or embedded conductors. In embodiments, the control lines comprise optical fibers and the switches comprise electrooptical switches controlled by the optical fibers.

In embodiments, the switches of the present antenna system are controlled by radio signals received by radio receivers or sensors. In an embodiment, the switches are controlled by ultrasound signals sent to receiver or sensors at each cell.

In an exemplary embodiment of the present invention, the antenna shell body comprises a metasurface, and power for the plurality of cells is provided by etched conductors in the metasurface. In an embodiment, power for the plurality of cells is provided by optical fiber. In further embodiments, power for the plurality of cells is provided by a radio frequency (RF) signal. In such an embodiment, the power provided by RF signal is supplied at a different frequency than transmitted or received signals and harvested and converted into direct current (DC) power for each cell. In another exemplary embodiment, each cell comprises a passive RF tag which is activated and controlled by a radiated RF signal. In different embodiments, the source of such RF control signal may be positioned inside or outside the shell body formed by the metasurface.

In an embodiment of the present invention, each cell is activated and powered by laser light. In an alternative embodiment, each cell is powered by solar cells positioned around the body.

In an exemplary embodiment of the antenna system, the processor is configured to form a dish-shaped reflector on a portion of the shell body by controlling a subset of the plurality of switches, which in turn switch on and off the reflectiveness of the cells. In an embodiment, the processor is configured to form a majority sphere reflector by controlling a subset of the plurality of switches. In a preferred embodiment, most of a sphere-shaped shell body is configured to be covered by reflective elements.

In an exemplary embodiment, capacitors and inductors are coupled to the plurality of cells and are used to control the phase of reflected or transmitted electromagnetic signals. In embodiments, the capacitors and inductors are lumped elements or trace circuitry.

In embodiments of the present antenna system, the shell body is filled with a foam, PTFE dielectric, HDPE, LDPE, dielectric fluid such as mineral or synthetic oil, polystyrene foam, polypropylene solid, or combinations thereof. In further embodiments, the shell body can be filled with air or another gas or combination of gases. In another embodiment, the shell body is inflatable. In further embodiments, the shell body comprises a rigid or semi-rigid sphere-shape filled with air. In embodiments, the shell body is coated with polyurethane plastic.

In embodiments of the present invention, the diameter of the shell body is less than 4; 4-5; approximately 4-5; 5-20; approximately 5-20; 20-100; approximately 20-100; 100-1,000; approximately 100-1,000; 1,000-10,000; approximately 1,000-10,000; 10,000-100,000; approximately 10,000-100,000; or greater than 100,000 wavelengths of a desired frequency to be transmitted or received.

Figure 8:
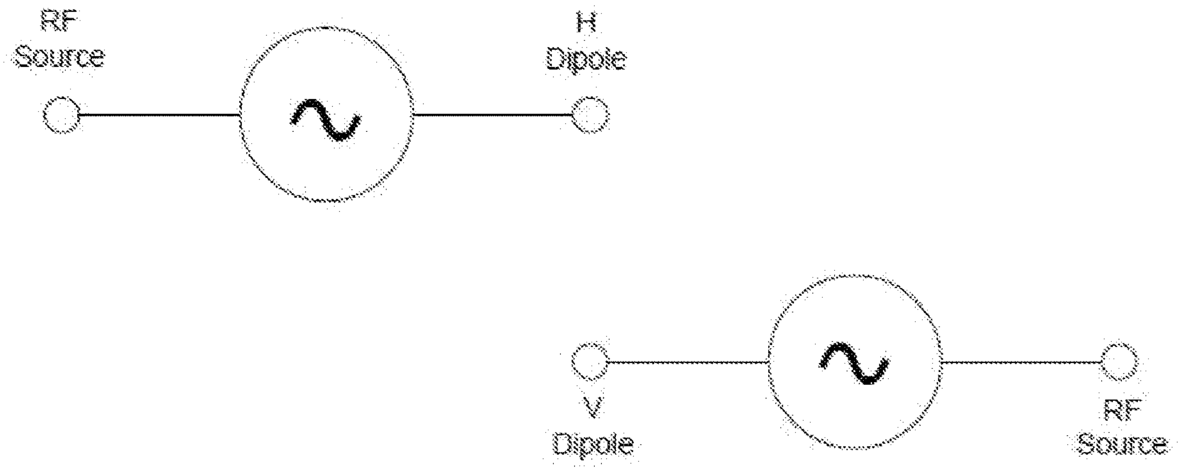
FIG. 8 is a block diagram of an embodiment of a crossed dipole feed useable with embodiments of the present invention.

In an exemplary embodiment, the feed radiator of the antenna system comprises two crossed dipoles configured to radiate or receive circular polarization energy. A block diagram of such a crossed dipole feed is shown in FIG. 8. In exemplary embodiments, feed polarization includes RHCP, LHCP, linear, and/or elliptical polarization.

In an exemplary embodiment, the feed radiator of the antenna system comprises three crossed monopoles configured to radiate or receive polarization energy. In such an embodiment, the feed accommodates all polarizations from any direction. Such polarization includes RHCP, LHCP, linear, and/or elliptical polarization.

In an exemplary embodiment, the feed radiator 30 of the antenna system comprises a four-wire feed connected to four elements of an angled antenna (see FIGS. 4-5) and configured to radiate or receive polarization energy. In such an embodiment, the feed antenna accommodates all polarizations from any direction. Such polarization includes RHCP, LHCP, linear, and/or elliptical polarization.

In exemplary embodiments, the RF feedline for the antenna system further comprises at least one of a coaxial transmission line, a waveguide feedline, a two parallel conductor feedline, a four parallel conductor feedline, and a six parallel conductor feedline. In embodiments, the feedline and transmission lines are filled with empty space, PTFE, polystyrene foam, PTFE solid or foam, polypropylene solid or foam, polyester, polyester foam, polyurethane, polyurethane foam, or combinations thereof.

In embodiments, the antenna system feed radiator comprises a diameter of less than ¼, ¼, approximately ¼, ½, approximately ½, ¾, approximately ¾, 1, approximately 1, or more than 1 wavelength of a desired transmit or receive signal.

In an exemplary embodiment, the antenna system processor is configured to track a moving target by controlling a subset of the plurality of switches. In an exemplary embodiment, the antenna system processor is configured to track multiple moving targets while the system is moving, tilting, and rocking. In an exemplary embodiment, the antenna system processor is configured to cause the cells to transmit a beam at multiple frequencies by controlling a subset of the plurality of switches. In an exemplary embodiment, the antenna system processor is configured to cause the cells to transmit multiple beams at multiple frequencies by controlling a subset of the plurality of switches.

In an embodiment of the present invention, the antenna system further comprises a battery. In embodiments, the antenna system is coupled to a stationary or mobile platform. In embodiments, the antenna system is configured to transmit to and receive from at least one of a terrestrial, airborne, or a space platform. In an embodiment, the antenna system shell body is collapsible. In embodiments, the antenna system is man portable. In embodiments, the antenna system is man mobile. In an embodiment, the antenna system is configured to unfurl in space.

In an exemplary embodiment, the antenna system comprises multiple cells flying in formation in space. In an exemplary embodiment, the antenna system comprises multiple cells flying as UAS drones flying in formation.

In an exemplary embodiment, the antenna system weighs less than 20 pounds; approximately 20 pounds; 20-100 pounds; approximately 20-100 pounds; 100-1000 pounds; approximately 100-1,000 pounds; 1,000-10,000 pounds; approximately 1,000-10,000 pounds; or over 10,000 pounds.

In various embodiments of the present invention the radio is implemented in software running on the processor. The processor of embodiments of the present invention can comprise, by way of example, a 16-, 32-, or 64-bit processor. The processor can be a microcontroller, embedded processor, system-on-a-chip (SOC), field programmable gate array (FPGA), or any other suitable customer or commercially available processor or controller.

In embodiments, cells substantially cover the antenna system shell body.

In embodiments, the shell body has an outer diameter between around 1 centimeter to 10 kilometers.

In embodiments, the cells transmit and receive in the frequency range of 1 mhz to 1 ghz, 1 ghz to 10 ghz, or 10 ghz to 100 ghz.

In embodiments, the cells and feed are formed as MEMS from nanomaterials.

In various embodiments of the present invention, the antenna system utilizes a mesh and/or metasurface antenna design configured to change from reflective to transmissive using solid state switches. In switched-mesh embodiments, the mesh may have any suitable shape including but not limited to square mesh, rectangular mest, triangular mesh, hexagonal mesh, and any combination of the foregoing. Switches positioned on conductors are configured to control the shape and size of the reflective area.

In switched-metasurface embodiments, metasurface cells may have any suitable shape including but not limited to circular loops, triangles, squares, rectangles, hexagons, octagons, crosses, X-shapes, and any combination thereof. The cells can be shaped as any regular or irregular polygon. The cells in various embodiments may be dipoles or lines, squares, rectangles, circular, or polygon patches connected by solid state switches.

In embodiments, the cells reflect circular polarized radiation, such as loops, linear polarization (LP) such as line traces, or alternating cells of linear X and linear Y polarization so that the aggregate surface reflects circular polarization (CP). In embodiments, the switches are electromechanical, solid-state FET, diodes, PIN diodes, varactor diodes, photo detector, photodiodes, phototransistors, and/or controlled by optical fiber control lines. In embodiments, the control lines are conductors embedded or etched on same substrate as the metasurface.

In embodiments, the surface is controlled to form a dish-shaped reflector behind a desired direction of beam. In further embodiments, the surface is controlled to form a majority-sphere reflector, i.e., a sphere with a hole in the direction of a desired beam. In embodiments, the metasurface is controlled such that when a switch is closed or turned off, the mesh or metasurface reflects RF radiation or allows radiations to pass through. In embodiments, the surface is controlled such that when the switch is open or turned on, the metasurface reflects radiation.

In embodiments, the metasurface uses lumped or trace C and L to switch between states that control the phase of the reflected or transmitted radiation, rather than simply switching between reflective and non-reflective states. In embodiments, the shell body cells comprise X-shaped cells with crossed half-wave dipoles and each dipole having a switch in the center. When the switches are open, the cells become ¼ wavelength conductors which are transparent to RF. When the switches are closed, the cells operate as crossed half-wave dipoles and reflect RF.

In embodiments, the metasurface or mesh is embedded into a ball-shaped polymer substrate, which is hollow with a feed radiator positioned in the center. In alternative embodiments, metasurface or mesh is embedded in a ball-shaped polymer substrate filled with foam, with a feed radiator positioned in the center.

In exemplary embodiments of the present invention, the shell body forms a polyhedron shape having between four to 1,000,000 surfaces. In preferred embodiment, the shell body forms a sphere-like shape. In an exemplary embodiment, most of the substantially spherical shell body is covered by reflective elements except for an opening at the top. Such configuration allows for beam pointing with sufficient gain in all directions with a single feed in the center of the shell body.

In exemplary embodiments, the present antenna system is capable of being used on a platform on the ground, on a ship, in the air, or in space. In embodiments, the present antenna system is used for two-way communication, mobile networks such as 4G or 5G, local area wireless network (LAN), wide-area wireless network (WAN), one-way satcom or terrestrial broadcast or reception, radar, intentional jammer, geolocation (i.e., to locate the source of transmissions), radioastronomy, among other uses. In embodiments, the present antenna system is used in a fixed installation; on a ground, ship, air, or space vehicle; for man-portable application; or for man-carry mobile application. The antenna system of the present invention is able to track a satellite or target while mounted on a moving platform by correcting for platform roll and pitch using sensors providing real time data and a filtering algorithm. In exemplary embodiments, the present antenna system is used for transmitting and/or receiving voice over internet protocol signal, email, text message, standard definition video (480p), high definition video (720p, 1080p, 4K), full-resolution MPEG HDTV, GNSS, and any other type of data transferable by electromagnetic wave signal.

Figure 2:
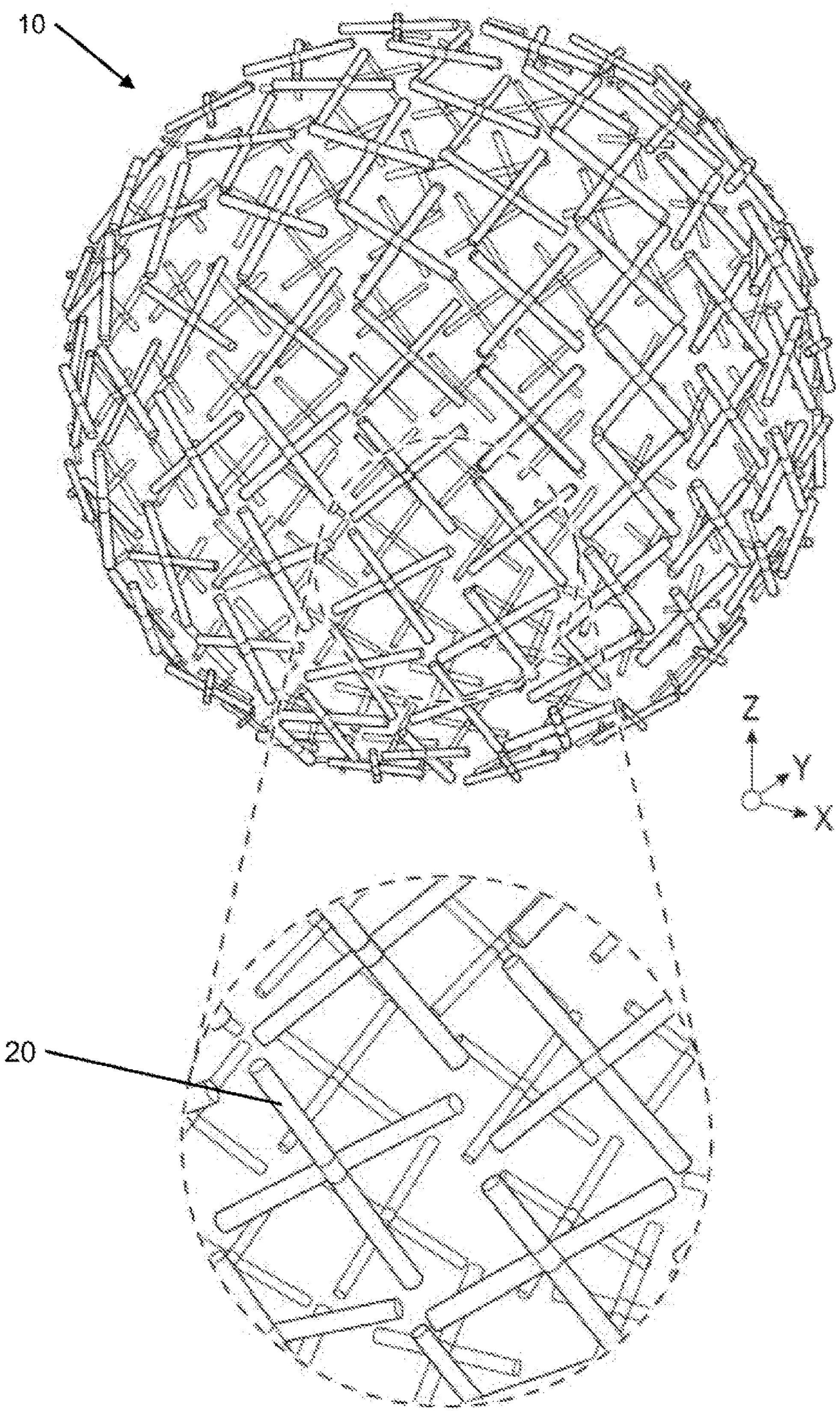
FIG. 2 shows an elevational view of an embodiment of an antenna system shell body of the present invention, with a portion of the shell body enlarged to further illustrate X-shaped crossed dipole cells.
Figure 3:
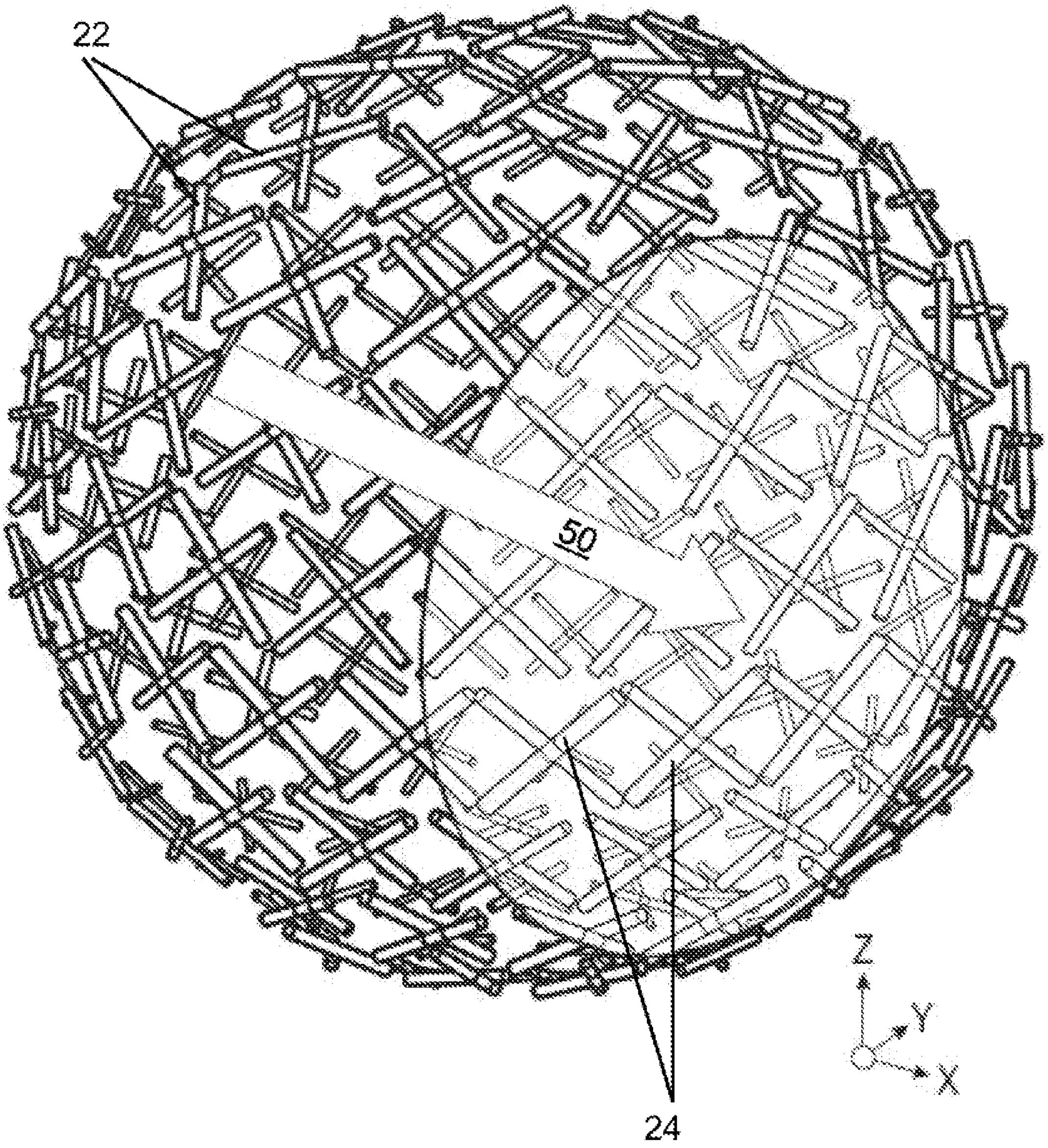
FIG. 3 shows a view of the antenna system shell body in a majority-sphere reflector configuration of one embodiment of the present invention.
Figure 4:
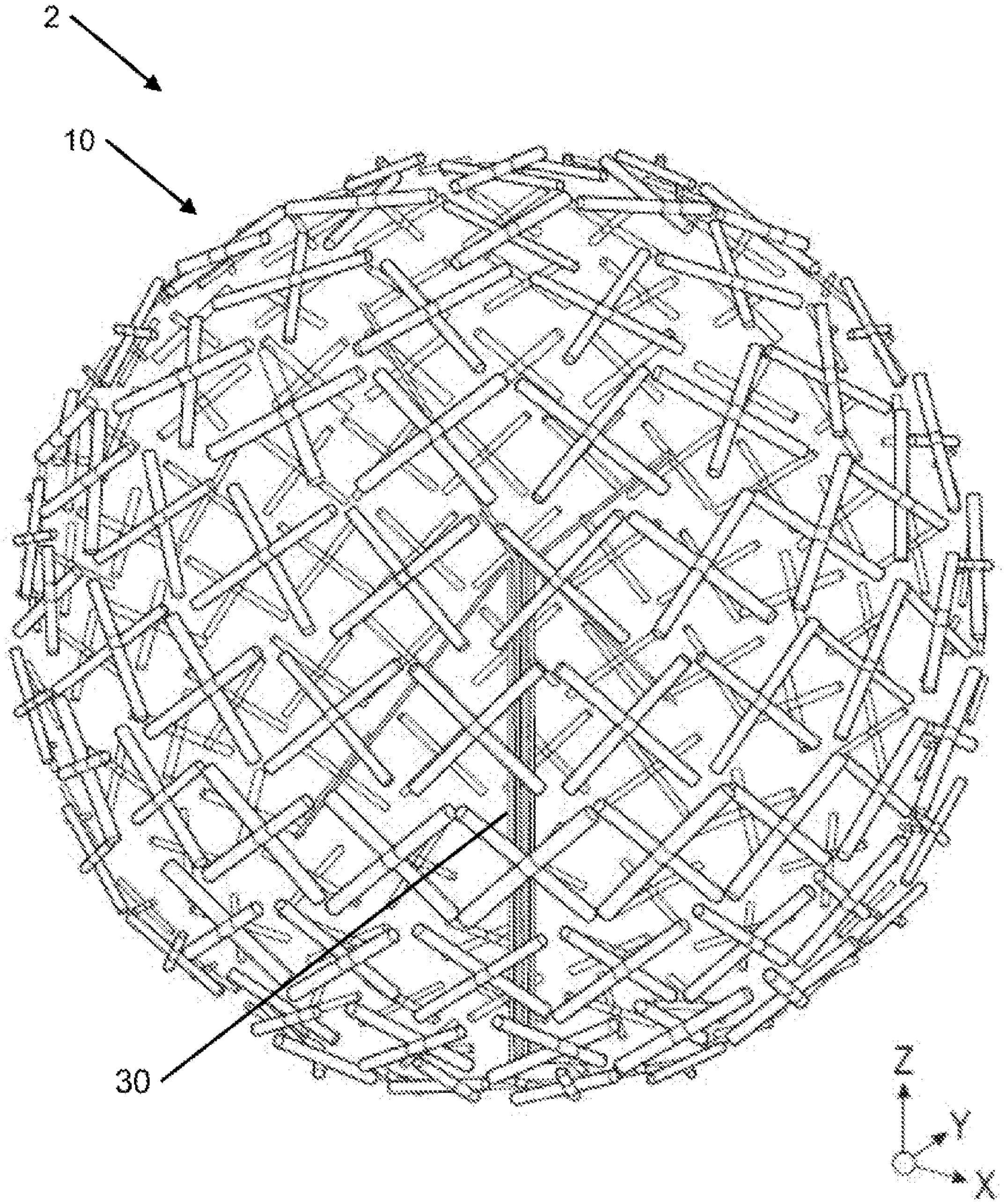
FIG. 4 shows an elevational view of the antenna system of one embodiment with an antenna feed radiator positioned near the center of the antenna shell body.

In an embodiment of the present invention, a crossed dipole cell geometry is utilized for the reflectors, as shown in FIGS. 2-4. In this embodiment, each leg of the dipole is one-quarter wavelength, and each of the two perpendicular dipoles have a switch in the center. When the switch is open, there are four quarter-wave conductors, and the induced current is very small and thus effectively transparent to the RF energy from the feed antenna. Conversely, when the switch is closed, the induced current is large and the cell reflects the RF energy.

In an embodiment, a feed radiator element consists of bent, crossed dipoles phased at 90-degrees for RHCP. The dipoles are bent in this embodiment to enhance the axial ratio (AR) at low elevation angles. The feed radiator element is configured to be positioned at the center of the shell body and to be fed with low-loss coax.

Figure 9:
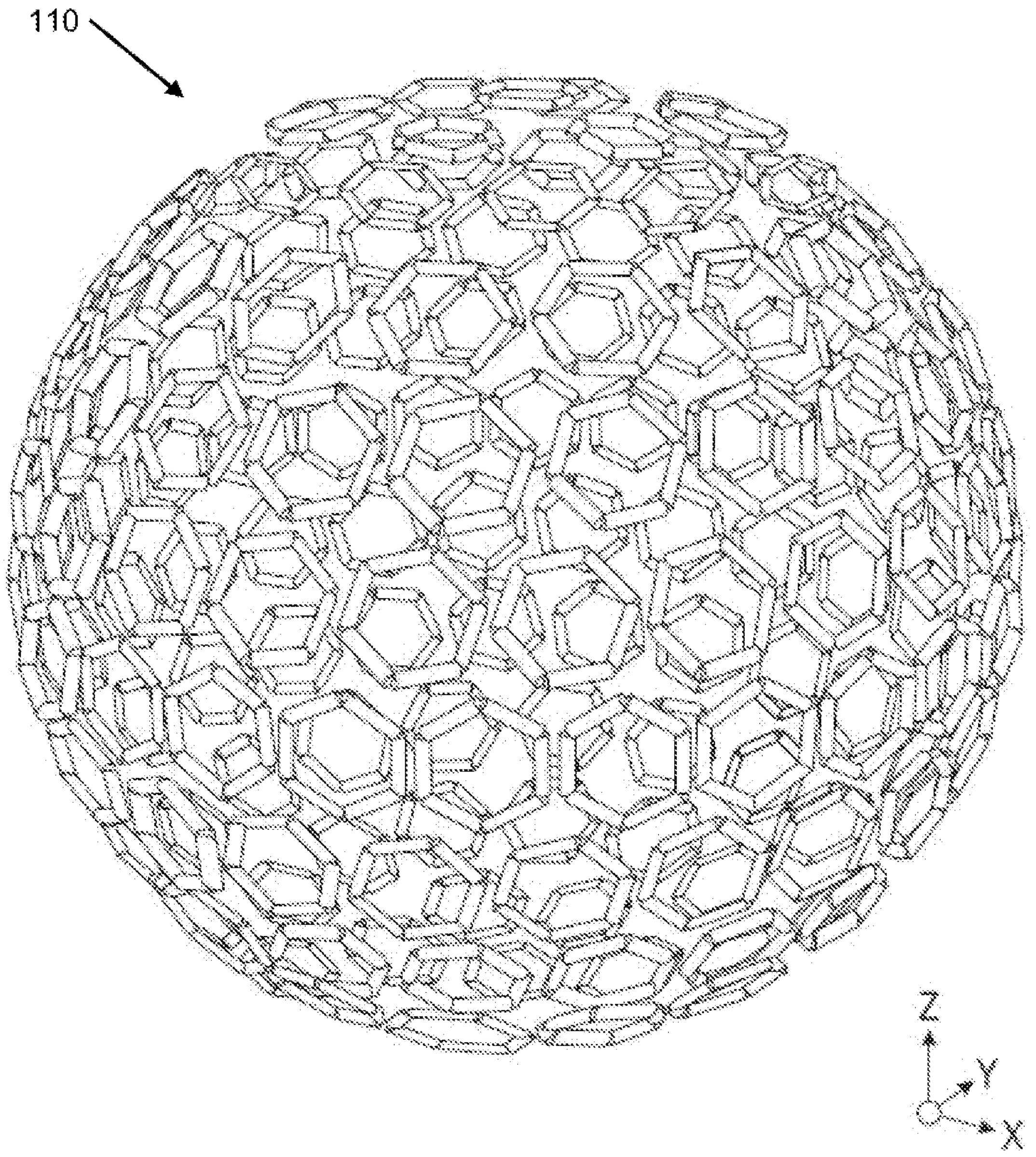
FIG. 9 shows an elevational view of an alternative embodiment of an antenna system of the present invention with hexagonal loop cells.
Figure 10:
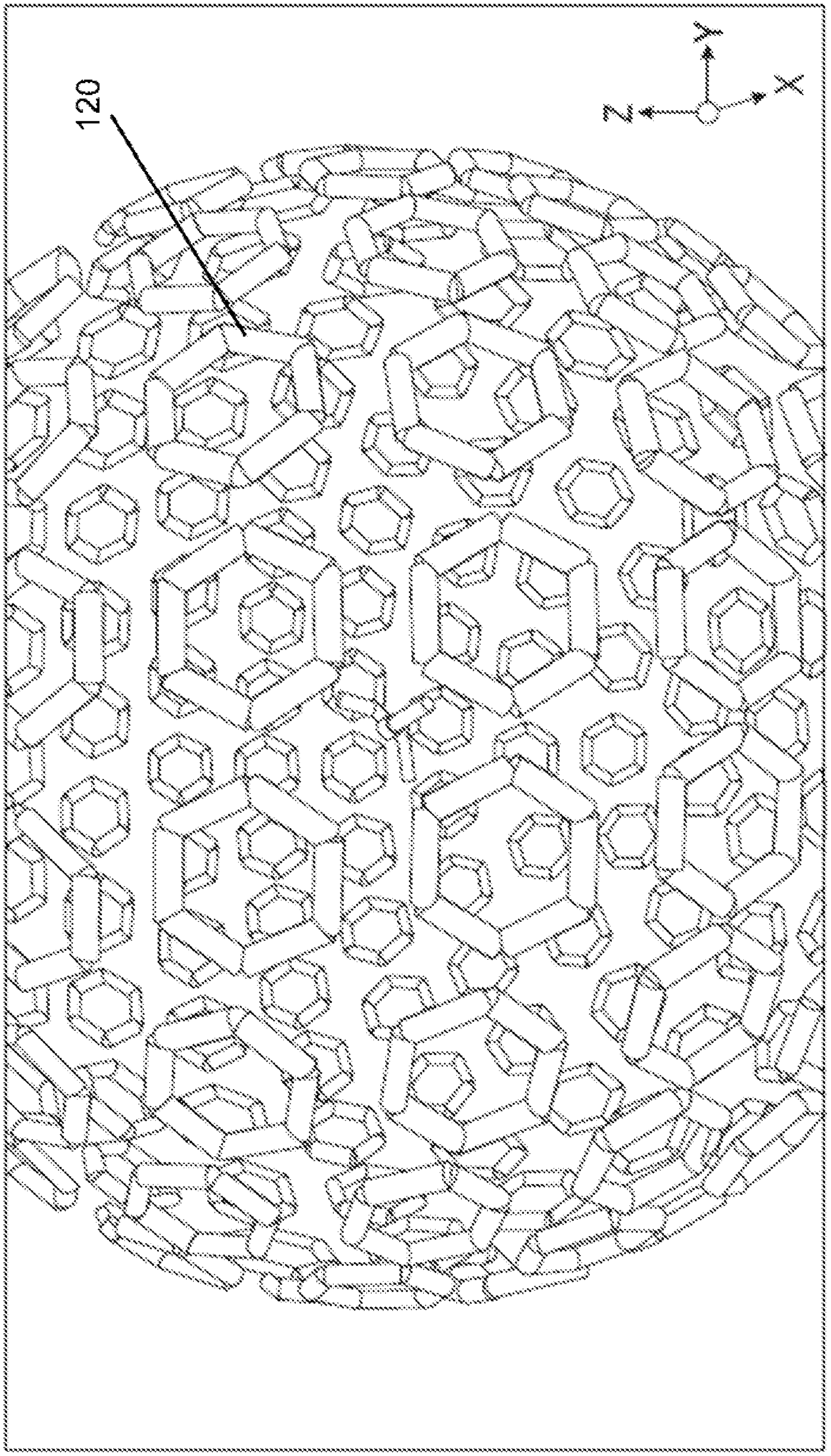
FIG. 10 shows an enlarged view of the alternative embodiment of FIG. 9 further illustrating hexagonal loop cells.
Figure 11:
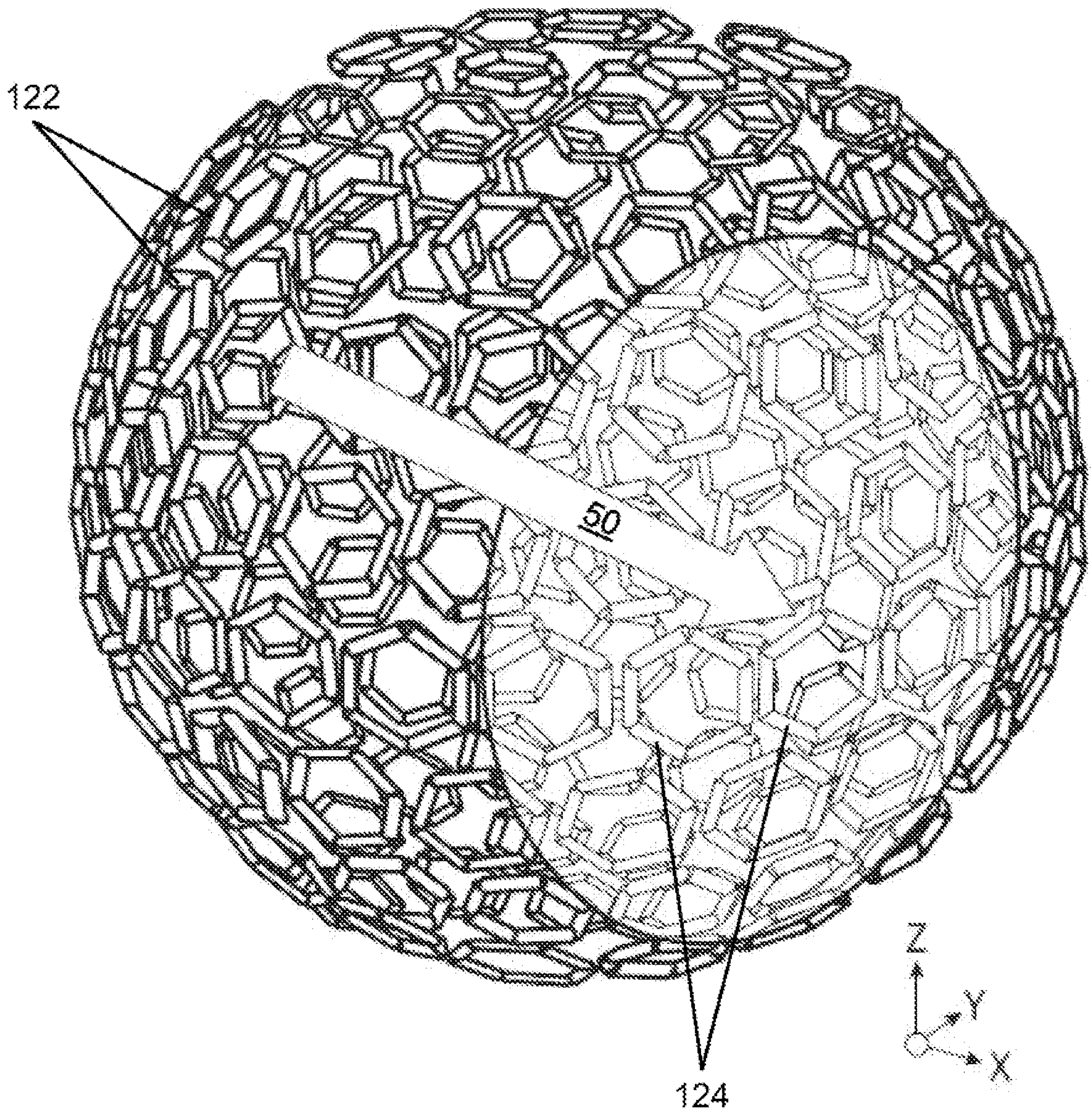
FIG. 11 shows a view of the alternative embodiment of the antenna system shell body in a majority-sphere reflector configuration.

In another exemplary embodiment, the shell body 110 is made of cells 120 having a hexagonal loop structure, as shown in FIGS. 9-11, forming an approximate sphere shape. In order for the antenna to be completely electronically steerable, everything has to remain fixed, and only solid-state switches in the reflector, which change the cells 120 between reflective 122 and non-reflective states 124, determine beam 50 steering. The majority-sphere shape delivers the required gain with the antenna feed mounted at the center of the shell body.

Figure 5:
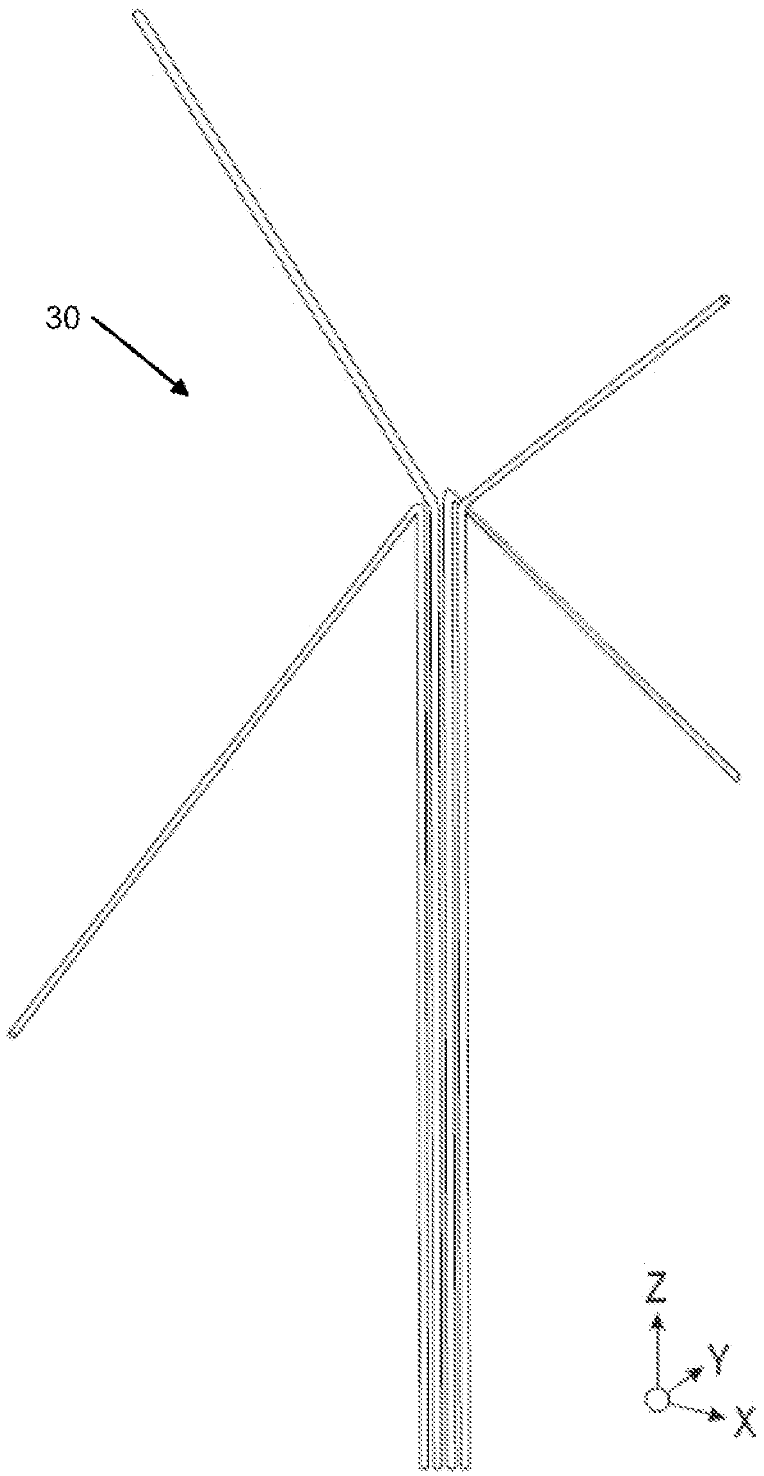
FIG. 5 shows an elevational view of a four-conductor feed radiator useable with embodiments of the present invention.

In an exemplary embodiment of the present invention shown in FIGS. 4-5, the antenna system feed comprises a four-conductor feed element with four parallel wire feed structures which are configured to be controlled to radiate with any polarization in any direction. In an exemplary embodiment, each conductor forms a straight line, is ¼ wavelength long, and is connected to a four-conductor transmission line. In one exemplary embodiment, each conductor is positioned at an angle of 109.472 degrees from the adjacent conductors on either side, such that there is a staggered, every other conductor upward and downward positioning. This structure gives it equal symmetry in all directions. Nevertheless, alternative configurations and angular positioning relationships of the four conductors are utilized in other embodiments of the present invention.

In embodiments with a four-conductor feed, a single balanced four wire feedline with no crossovers, achieves a fixed phase center in all directions.

Figure 6:
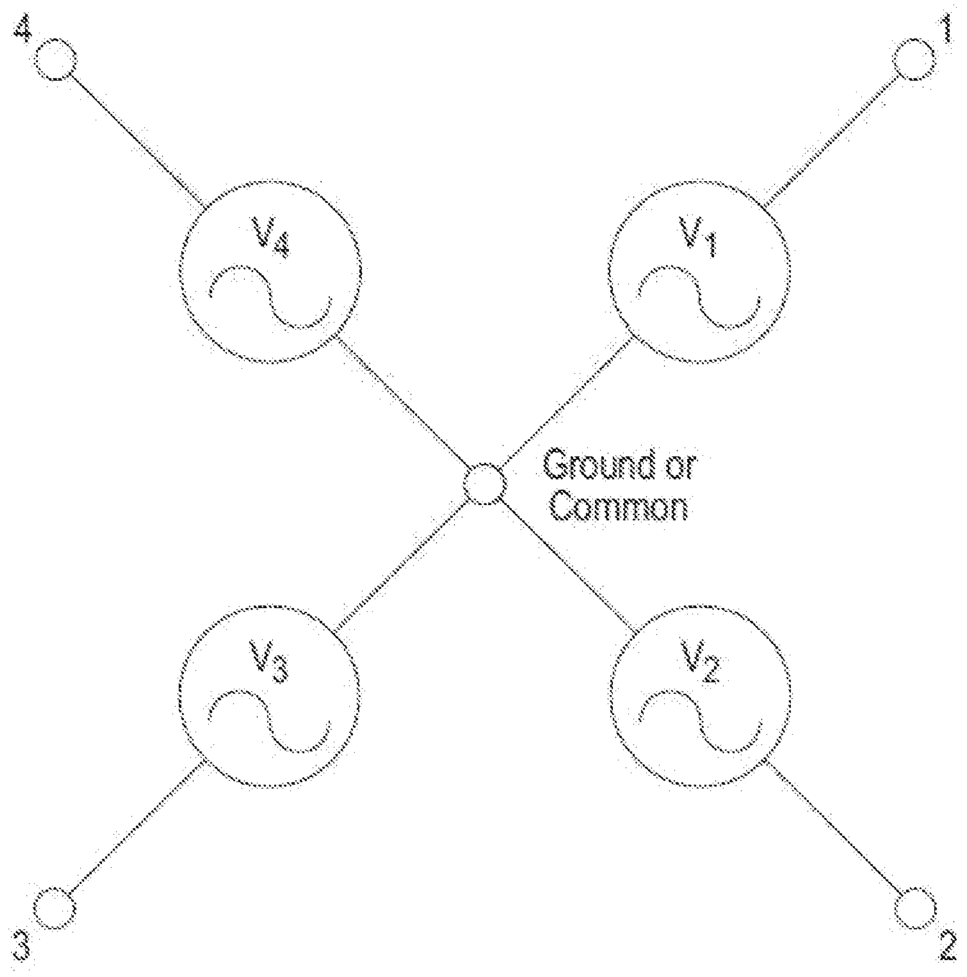
FIG. 6 is a block diagram of an embodiment of a four-conductor feed useable with the antenna system of the present invention.

Using four coherent software-defined radios (SDRs) or other digital waveform generators as shown in FIG. 6, each of the four conductors of the feedline are connected to a separate SDR output, with a common signal return connection (ground or outer conductors of all SDRs tied together).

The X, Y, and Z are baseband complex vectors representing relative magnitudes and phases of the modulated RF carrier signals in the X, Y, and Z polarizations. For example, to transmit RHCP in the +Z direction, then: X=1+j0; Y=0−j; Z=0; and the v1 through v4 signals are formed using the below equations. Sending these signals to the four-conductor ("tetra") feed element results in RHCP in the +Z direction.

$$v_4 = +\frac{X}{2} - \frac{Y}{2} - \frac{Z}{2}$$

-continued $$v_3 = +\frac{X}{2} + \frac{Y}{2} + \frac{Z}{2}$$

$$v_2 = -\frac{X}{2} + \frac{Y}{2} - \frac{Z}{2}$$

$$v_1 = -\frac{X}{2} - \frac{Y}{2} + \frac{Z}{2}$$

Figure 7:
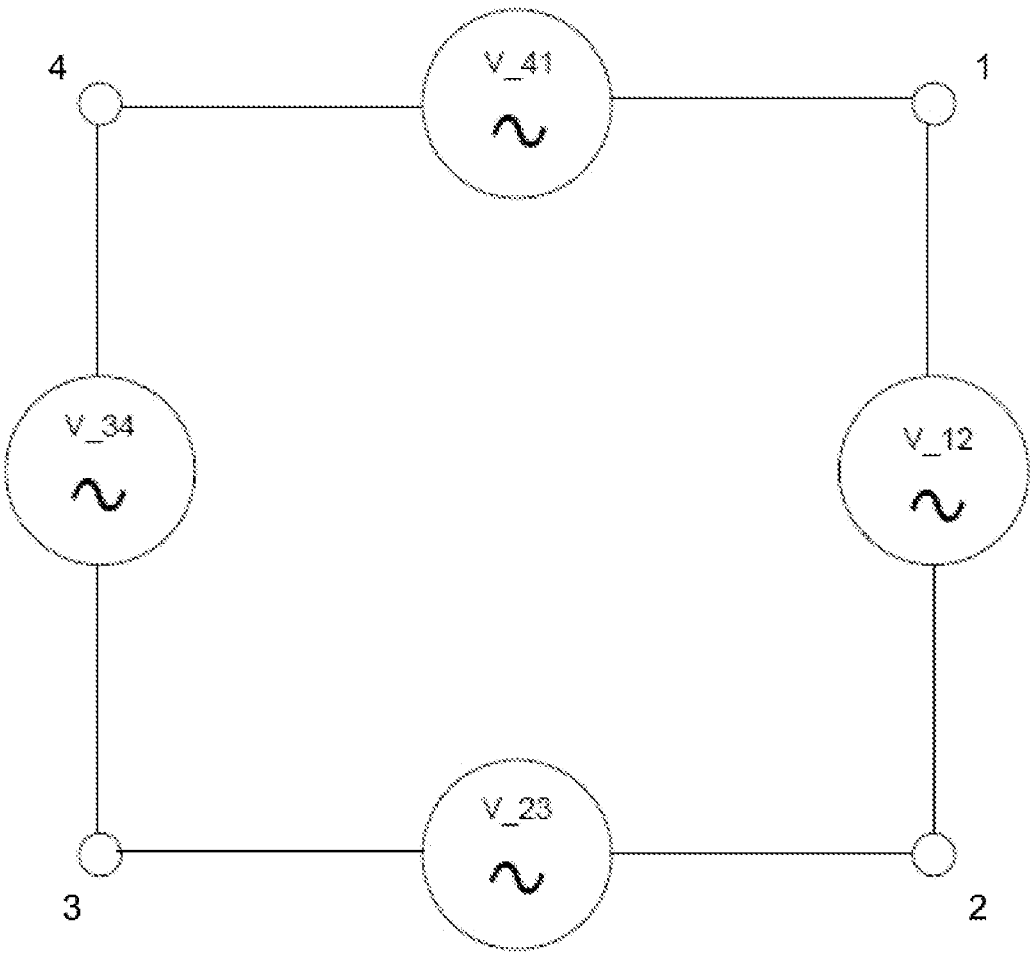
FIG. 7 is a block diagram of another embodiment of a four-conductor feed of the antenna system of the present invention.

An alternative configuration of a four-conductor feed is shown in FIG. 7. This alternative configuration provides 50 ohm impedance for all 4 voltage sources. The voltages in FIG. 8 are related to the voltages in FIG. 7 as follows: V_12=V1−V2; V_23=V2−V3; V_34=V3−V4; and V_41=V4−V1.

By choosing other values of X, Y, and Z, polarization can be formed in any direction utilizing the antenna system of the present invention.

In an exemplary embodiment of the present invention, fabrication of the antenna comprises manufacture of 24-50 flexible Kapton film printed circuit boards (PCBs). The flexible PCBs are etched with electronically controlled reflector (ECR) cells and have switch components mounted thereon. Control and power lines are also included. In an embodiment, the flexible PCBs are attached to a durable hollow ball made from tough elastomer. Once the connections are completed, the surface is conformal coated with a two-part, tough urethane rubber coating which seals and protects the circuits and hold them in place. The control and power lines are attached via connectors around a cone shaped protrusion at the base of the electronically controlled reflector (ECR) ball shell body. The ball shell body further comprises a cone-shaped indentation modem enclosure for mechanical durability.

Figure 12:
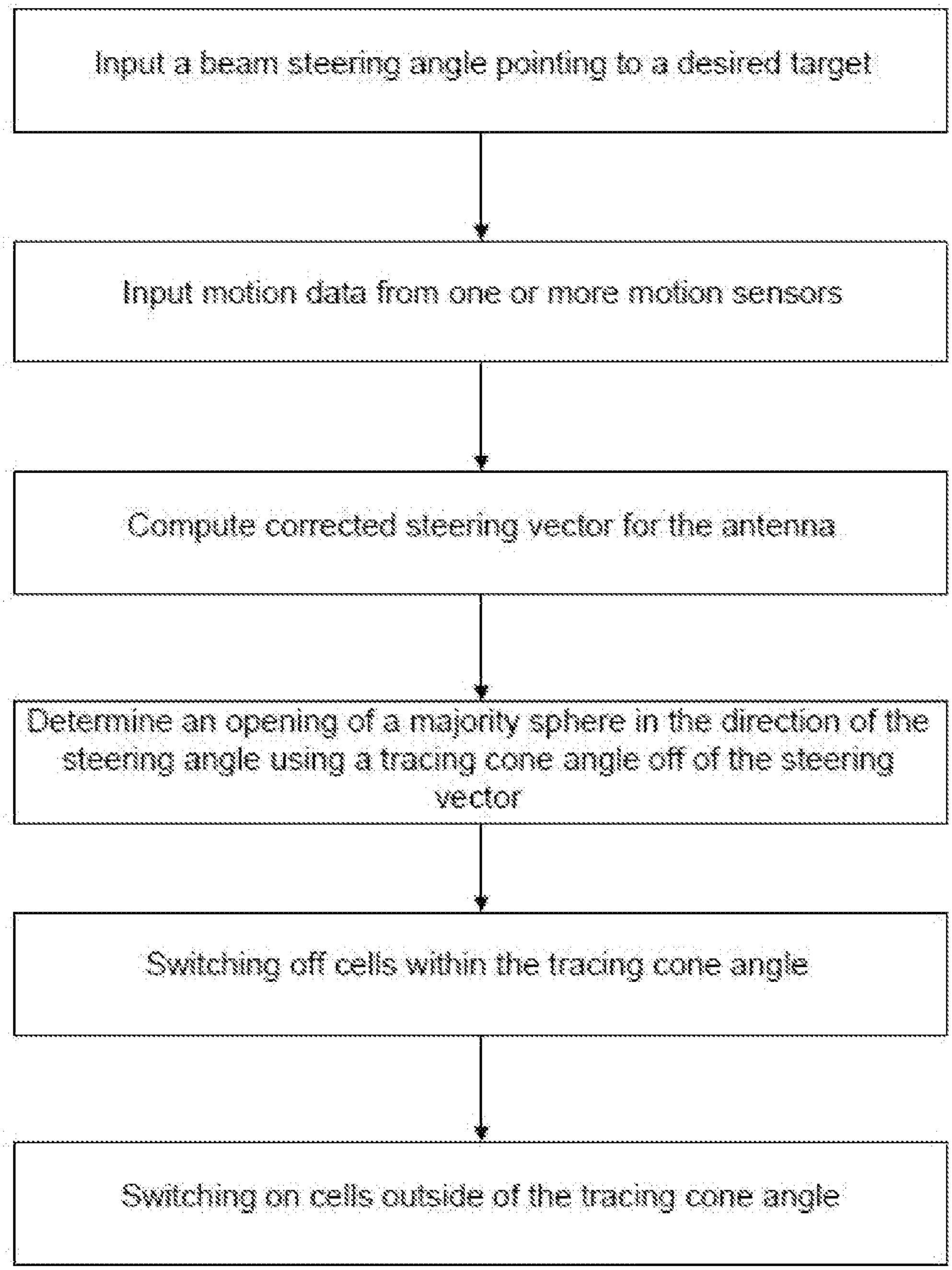
FIG. 12 is a flow chart showing an embodiment of a beam steering algorithm for an antenna system of the present invention.

In an exemplary embodiment, the processor of the present invention is programmed using the algorithm shown in FIG. 12 in association with beam steering. Note that the beam pointing algorithm uses input from three-axis tilt sensors and a compass sensor to correctly point the beam while compensating for the antenna attitude. Input is raw beam steering angle (theta_raw,phi_raw) based on true zenith and north, pointing to desired satellite based on user location and time. Input platform motion data from platform sensors: (theta_roll, phi_pitch); compute corrected steering vector wrt Antenna: (theta, phi)=([theta_raw+theta_roll], [phi_raw+phi_pitch]). The opening of majority sphere shell body is defined in the direction of steering angle. The size of the opening is defined as the cone from the center of the sphere, formed by tracing cone_angle (Chi) off steering vector and tracing it as rotated around steering vector. Cells that are within this cone are to be switched OFF (i.e., pass the RF through). The rest of the cells in the ECR sphere shell body are to be switched ON (reflect RF). Note that cone_angle, Chi, will depend on the size of the sphere in wavelengths, the geometry of the cells, and the density of cells over the sphere. Chi can be optimized for maximum gain, or to cover a specific beamwidth. Nominal Chi is 30-35 degrees. Each cell element has a known position theta_cell, phi_cell on the ECR shell body. Based on the steering vector and Chi, the processor determines the angle Beta between each cell and the steering vector. If Beta is less than Chi, cell=OFF. Otherwise, cell=ON.

Certain terminology is used in the description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. Said terminology shall include the words specifically mentioned, derivatives thereof, and words of similar meaning.

As used in this specification and the appended claims, the singular forms "a", "an", and "the" include plural references unless the context clearly dictates otherwise. Thus, for example, a reference to "a method" includes one or more methods, elements, and/or steps of the type described herein and/or which will become apparent to those persons skilled in the art upon reading this disclosure and so forth.

Unless defined otherwise, all technical and scientific terms used herein have the same meaning as commonly understood by one of ordinary skill in the art to which this invention belongs. Although any systems, elements, methods and materials similar or equivalent to those described herein can be used in the practice or testing of the present invention, the preferred systems, elements, and methods and materials are now described. All publications mentioned herein are incorporated herein by reference in their entirety.

"Substantially," "approximately," "around," "about," and similar words of degree mean to be more-or-less conforming to the particular dimension, range, shape, concept, or other aspect modified by the term, such that a feature or component need not conform exactly but is within plus or minus 15 percent of the stated value. The word "coupled" with respect to two elements means those elements are directly or indirectly attached, linked, joined and/or in mechanical or electrical communication. By way of example, when two elements are coupled, they can be mechanically or electrically linked by one or more intermediate elements. "Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

Having thus described the invention, what is claimed as new and desired to be secured by Letters Patent is:

1. An antenna system comprising:

a substantially ellipsoid-shaped shell body;

a plurality of cells coupled to the body, wherein each cell comprises a conductive material;

a plurality of switches coupled to the plurality of cells, wherein each switch is configured to change its coupled cell between one of a reflective and non-reflective state;

a feed located around the center of the shell body and comprising four parallel feed conductors, wherein each of the four feed conductors are connected to a separate but phase-coherent input or output of a software-defined radio and have a common signal return connection;

an antenna comprising four angled elements connected to the four parallel feed conductors; and a processor coupled to the feed, the software-defined radio, and the plurality of switches, wherein the processor is configured to produce a shaped beam by controlling a subset of the plurality of switches.

2. The antenna system of claim 1, wherein the body comprises a substantially spherical shape.

3. The antenna system of claim 1, wherein the body comprises a polyhedron.

4. The antenna system of claim 1, wherein at least one of the plurality of cells comprises a closed geometric shape.

5. The antenna system of claim 1, wherein at least one of the plurality of cells comprises an open geometric shape.

6. The antenna system of claim 5, wherein the open geometric shape comprises two or more intersecting lines.

7. The antenna system of claim 1, wherein the plurality of cells comprises a configuration of different geometries to allow for at least one of multifrequency operation and better coverage.

8. The antenna system of claim 1, wherein at least one of the plurality of cells reflects polarized radiation.

9. The antenna system of claim 8, wherein the polarized radiation comprises at least one of circular, linear, or elliptical polarized radiation.

10. The antenna system of claim 1, wherein each of the plurality of cells are separately controlled.

11. The antenna system of claim 1, wherein the plurality of switches are coupled to one or more control lines.

12. The antenna system of claim 11, wherein the control lines comprise one or more of etched or embedded conductors.

13. The antenna system of claim 1, wherein the processor is configured to form a dish-shaped reflector on a portion of the body by controlling a subset of the plurality of switches.

14. The antenna system of claim 1, wherein the processor is configured to form a majority-sphere reflector by controlling a subset of the plurality of switches.

15. The antenna system of claim 1, wherein capacitors and inductors are coupled to the plurality of cells and are used to control a phase of reflected or transmitted signals.

16. The antenna system of claim 1, wherein the processor is configured to cause the plurality of cells to transmit a beam at multiple frequencies by controlling a subset of the plurality of switches.

17. The antenna system of claim 1, wherein the processor is configured to cause the plurality of cells to transmit multiple beams at multiple frequencies by controlling a subset of the plurality of switches.

18. The antenna system of claim 1, wherein each of the plurality of cells comprises a nested surface.

19. An antenna system comprising:
a substantially spherical shell body;
a plurality of cells coupled to the body, wherein each cell comprises crossed dipoles with a switch in the center that when open causes the cell to become a conductor for radio signals and when closed to become a crossed half-wave dipole for reflecting radio signals;
a feed located around the center of the shell body and comprising four parallel feed conductors;
an antenna comprising four angled elements connected to the four parallel feed conductors, and wherein the angled elements are arranged to radiate any polarization in any direction over a 4-pi steradian sphere;
a software-defined radio with four coherent channels coupled to the four feed conductors; and
a processor coupled to the feed, the software-defined radio, and to the plurality of switches, wherein the processor is configured to form a majority-sphere reflector at a desired frequency by controlling a subset of the plurality of switches.

* * * * *